United States Patent Office 2,721,827
Patented Oct. 25, 1955

2,721,827

COMPOSITION CONTAINING POLYAMINE RESIN HAVING ADSORBED THEREON AN ANION OF PARA-AMINOSALICYLIC ACID

Edwin L. Gustus, Chicago, Ill.

No Drawing. Application August 29, 1952, Serial No. 307,158

3 Claims. (Cl. 167—65)

The invention relates to adsorption compounds of substances which delay the development of the resistance which tubercle bacilli develop to streptomycin and other antibiotics used in the treatment of tuberculosis.

In recent years it has been found that paraminosalicylic acid not only has a tuberculostatic action, but more important is its power to retard the emergence of strains of tubercle bacilli resistant to streptomycin and dihydrosteptomycin. The para-aminosalicylic acid, also known in the art as PAS, is given orally and concomitantly with the antibiotic which is administered parenterally. The PAS now is generally given with streptomycin or dihydrostreptomycin, with isonicotinic acid hydrazide, or the N-isopropyl derivative. An ordinary dose of PAS is about 10 to 15 grams per day, given in four parts orally with meals and just before going to bed. Higher dosages are desirable but even with the smaller dosages it often causes gastrointestinal irritation and nausea so that the dosage must often be further reduced or eliminated.

An object of this invention is to provide a compound which is substantially as effective as PAS in delaying the development of strains of tubercle bacilli resistant to antibiotics but which will not bring about any substantial gastrointestinal irritation and nausea.

A further object is to provide a compound of PAS which can be administered orally to the patient in much greater dosages than PAS without excessive discomfort.

These objects are accomplished by combining para-aminosalicylic acid (PAS) with an acid adsorbing resin. The product is a resin complex or resin adsorption compound. The compound, like PAS, may be administered orally and concomitantly with the antibiotic which may be given parenterally. Likewise the PAS adsorption compound may be given alone but preferably it is given concomitantly with isonicotinic acid hydrazide or its N-isopropyl derivative and/or with appropriate antibiotics parenterally. The amount of PAS adsorption compound administered to the patient may be in the same equivalent amount as for PAS but in general it is preferable to use it in much higher amount, such as two or three times the amount, as this can be done without too great discomfort and has the advantage of giving a high blood level of PAS.

The resin adsorption compounds of this invention are made by contacting an acid adsorption resin (commonly called an anion exchange resin) with the para-aminosalicylic acid (PAS). The preferred product is obtained by reacting a weak base acid adsorbing resin of high capacity such as a polyamine resin having primary, secondary or tertiary amino groups, with the PAS. This reaction may be represented as follows:

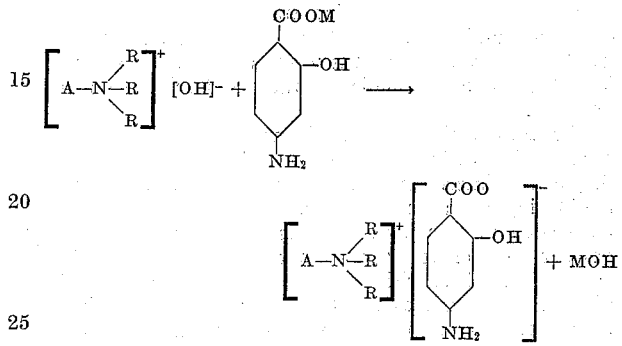

The preferred adsorption compound is one which is substantially saturated with the PAS, viz., containing from 47% to 53% by weight PAS.

Another form of the complex which is also useful but in which the PAS portion is more strongly bound and is present in lesser amount even in the saturated compound is obtained by reacting a strong base acid adsorbing resin such as a quaternary ammonium anion exchange resin with either the PAS or its salts. This reaction may be represented for the salt of the PAS as follows:

$$\left[ A-N\begin{matrix}R\\R\\R\end{matrix}\right]^+ [OH]^- + \begin{pmatrix}COOM\\-OH\\NH_2\end{pmatrix} \longrightarrow$$

$$\left[ A-N\begin{matrix}R\\R\\R\end{matrix}\right]^+ \begin{pmatrix}COO\\-OH\\NH_2\end{pmatrix}^- + MOH$$

In the above equations, (A) represents a resin nucleus, such as a polyamine-aldehyde or polyamine-ketone condensation product having amino or imino or tertiary amino groups represented by —$NH_2$, —NHR, —NR'R" where R represents an aliphatic, alicyclic, aromatic or alkaryl residue and M represents a metal or ammonium ion.

Another form of the complex or adsorption compound results from the use of anion exchange resins which have been treated with a dilute solution of a soluble aluminum salt such as, for example, aluminum sulfate. Such products are included in the term "acid absorbing resins."

The term "acid adsorbing resins" as used in this specification is to be understood as including what are commonly called anion exchange resins, thus covering resins containing no attached anion, those in free base form, and those which contain an anion of a weak acid. Acid adsorbing resins which can be utilized in the present invention are numerous and include those resins in which the acid adsorption or acid neutralization depends upon, for example, the presence in the resin of aromatic or aliphatic primary, secondary or tertiary amino groups, or the quaternary ammonium group structures. They can be amine aldehyde or amine ketone condensation products. Such amine resins are referred to in this specification as polyamine acid adsorbing resins. One type of acid adsorbing resin which has given satisfactory results is sold by Rohm and Haas Co. under the trade name "XE-58." This is a weak base polyamine anion exchange resin. More particularly it is a polyethylene polyamine methylene substituted resin of diphenylol dimethyl methane and formaldehyde. The polyamine acid adsorbing resins disclosed in United States Patent 2,402,384 have also been highly satisfactory.

In addition to the particular type of polyamine aldehyde resin used in the examples cited here, other acid adsorbing resins can be used provided, of course, that they have sufficient adsorbing capacity for the carboxylic acid used in preparing the composition of this invention and are physiologically innocuous. For example, a metaphenylene diamine-formaldehyde acid adsorbing resin could have been used although its adsorbing capacity is somewhat lower than that of the resin given in the examples. Still other acid adsorbing resins can be employed, such as acid adsorbing resins prepared from amines and polysaccharides, ethanolamine alkyd resins, alkylated aromatic diamines, and aromatic diamines both unmodified and modified by incorporating into the resin molecular structure during preparation alkyl groups to form quaternary ammonium bases. Also amine resins co-condensed with aliphatic polyamines or with polyimines can be used, or amine resins treated during preparation with cyanamide or with dicyandiamide, thus introducing the strongly basic guanidino group. Acid adsorbing resins prepared by reacting aliphatic polyamines with polyhalogen derivatives of hydrocarbons can be used, as well as acid adsorbing modified phenolic resins. Another suitable type of acid adsorbing resins contains a nucleus of polystyrene or modified polystyrene to which are attached primary, secondary or tertiary amino groups or organic groups containing such primary, secondary or tertiary amino groups. In all cases, the resin should be physiologically innocuous or inert and should be sparingly soluble or insoluble in water and in dilute acids or bases.

The compositions of this invention can be used as such, which is in substantially moisture-free form, or they can be intermixed with other pharmaceutically compatible ingredients or excipients. For example, it may be desired to give it in capsules, pills, tablets, or as a powder, or even in syrups, elixirs, or emulsions. They can be intermixed with flavoring and coloring materials, clay, bentonite, antacids such as magnesium or aluminum oxide, aluminum phosphates, basic aluminum amino acetate and analogues and the like or bismuth sub-oxide, or bismuth or zirconium subcarbonates, emollients such as methyl cellulose, gastric mucin, carboxy methyl cellulose, sodium carboxy methyl cellulose, sulfated gluten and the like, or with naturally occurring gums and mucilages, gelatin, amino acids and their salts, peptones, peptides, or with any other ingredients cooperative therewith or not incompatible therewith.

The following examples illustrate the invention. In all of these examples the acid adsorbing resin used was "XE-58" resin in finely powdered form and in free base form. The resin contained 2% moisture, removable by heating to 50° C. and maintaining at 50° C. until a constant weight was attained. In all examples, the weight of resin is stated on a dry basis. It will be evident from from these examples that drying the resin, before use in the preparation of the adsorption compounds, is unnecessary. Of course, the same process can be used when making adsorption compounds using other acid adsorbing resins.

*Example I*

Amberlite XE-58, 25 grams, was added to a flask containing 250 ml. of 50% ethanol-water solution. After 28 grams of 4-aminosalicylic acid was added, the material was stirred overnight. The resin was collected, washed with acetone and dried to constant weight at 50° C. Weight 47.5 grams; 4-aminosalicylic acid= 47.5%.

*Example II*

The same as Example I except that the solvent was 50% acetone-water. The resin composition weighed 48.4 grams and contained 48.5% 4-aminosalicyclic acid.

*Example III*

A kettle fitted with an agitator was charged with 200 lbs. of distilled water and 51.5 lbs. of Amberlite XE-58. The mixture was agitated for 3¾ hours at a temperature not exceeding 25° C., then the resin was dropped to a suction filter and freed of most of the water by application of vacuum to the filter for a period of 30 minutes.

The damp resin was returned to the kettle which contained 335 lbs. of distilled water and agitated as 52 lbs. of 4-aminosalicylic acid was added in 7 equal portions over the period of an hour. After all of the 4-aminosalicylic acid was in, the material was stirred for 6½ hours and then dropped to the suction filter. Vacuum was applied to the filter to remove most of the water. The damp cake was slurried twice with 80 lbs. of acetone, vacuum was applied until the material was free of most of the acetone and then the resin composition was transferred to an air drier and dried to constant weight at 50° C. The product which weighed 101.5 lbs. contained 50 lbs. of 4-aminosalicylic acid or 49% by weight.

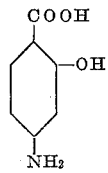

While the foregoing examples illustrate the preparation of adsorption compounds of PAS in which the acid adsorbing resin is saturated with PAS, the present invention is not limited to the use of resins saturated either at room temperature or at elevated temperature with this acid.

It will also be understood that the invention contemplates within the scope of the claims the resin complexes of other carboxylic acids which have in their uncomplexed form the delaying effect on the development of antibiotic resistant tubercle bacilli substantially equivalent to uncomplexed para-aminosalicyclic acid. For example, it is intended to include such materials in which there is a substitution of the hydrogen of the hydroxy group or the hydroxy group of the PAS. An example would be an acid adsorbing resin having adsorbed thereon a para-amino acetyl salicylic acid. Another type of substitution is a lower alkyl, e. g., methyl and ethyl ether of the para-amino-salicylic acid. An example is the adsorption compound of dimethyl ether of PAS.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A composition comprising a polyamine acid adsorbing resin having adsorbed thereon an anion of para-aminosalicylic acid.

2. A composition comprising a weak base polyamine acid adsorbing resin having adsorbed thereon an anion of para-aminosalicylic acid.

3. The composition of claim 1 wherein the acid adsorbing resin is saturated with respect to paraaminosalicylic acid.

References Cited in the file of this patent

UNITED STATES PATENTS 2,554,072    Sullivan et al. _____ May 22, 1951

FOREIGN PATENTS 665,073    Great Britain _____ Jan. 16, 1952

OTHER REFERENCES

Bogen: Amer. Rev. Tuberculosis, vol. 61, No. 2, February 1950, pp. 226–246.

Wheaton Industrial Engineering Chemistry, May 1951, vol. 43, pp. 1088–1093.